United States Patent
Rivkin et al.

(10) Patent No.: US 10,699,733 B1
(45) Date of Patent: Jun. 30, 2020

(54) WRITE HEAD WITH REDUCED SIDE TO TRAILING SHIELD SPACING

(71) Applicant: Seagate Technology LLC, Cupertino, CA (US)

(72) Inventors: Kirill A. Rivkin, Minneapolis, MN (US); Wei Tian, Eden Prairie, MN (US); XiaoHong Zhang, Eden Prairie, MN (US); Yi Liu, Edina, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/174,551

(22) Filed: Oct. 30, 2018

Related U.S. Application Data

(62) Division of application No. 15/662,682, filed on Jul. 28, 2017, now Pat. No. 10,141,014.

(51) Int. Cl.
| | |
|---|---|
| *G11B 5/127* | (2006.01) |
| *H04R 31/00* | (2006.01) |
| *G11B 5/31* | (2006.01) |
| *G11B 5/11* | (2006.01) |
| *G11B 5/23* | (2006.01) |

(52) U.S. Cl.
CPC .............. *G11B 5/315* (2013.01); *G11B 5/112* (2013.01); *G11B 5/1278* (2013.01); *G11B 5/23* (2013.01); *G11B 5/3116* (2013.01); *G11B 5/3146* (2013.01); *G11B 5/3163* (2013.01)

(58) Field of Classification Search
CPC ....... G11B 5/315; G11B 5/112; G11B 5/1278; G11B 5/23; G11B 5/3116; G11B 5/3146; G11B 5/3163
See application file for complete search history.

(56) References Cited

U.S. PATENT DOCUMENTS

| | | | | |
|---|---|---|---|---|
| 7,551,396 B2* | 6/2009 | Hsu | ...................... | G11B 5/1278 360/125.02 |
| 7,633,713 B2* | 12/2009 | Chen | ...................... | G11B 5/112 29/603.01 |
| 7,649,712 B2* | 1/2010 | Le | ........................ | G11B 5/1278 360/125.3 |
| 8,051,552 B2* | 11/2011 | Jiang | ...................... | G11B 5/112 205/119 |

(Continued)

OTHER PUBLICATIONS

Prosecution from U.S. Appl. No. 15/662,682, filed Jul. 28, 2018, including: Notice of Allowance and Fees Due (PTOL-85) dated Jul. 25, 2018, 8 pages; Non-Final Rejection dated Apr. 5, 2018, 8 pages; and Requirement for Restriction/Election dated Feb. 5, 2018, 6 pages; 22 pages total.

*Primary Examiner* — Paul D Kim
(74) *Attorney, Agent, or Firm* — Westman, Champlin & Koehler, P.A.

(57) ABSTRACT

A write head including a bearing surface and a write pole having a front surface that forms a portion of the bearing surface. The front surface has a leading edge, a trailing edge and side edges connecting the leading and trailing edges. The write head also includes side shields proximate to the side edges of the write pole, and a trailing shield over the write pole and the side shields. A trailing shield-write pole gap is present between the trailing edge and the trailing shield, and a trailing shield-side shield gap is present between the trailing shield and the side shields. The trailing shield-shield shield gap is substantially less than the trailing shield-write pole gap.

12 Claims, 13 Drawing Sheets

(56) References Cited

U.S. PATENT DOCUMENTS

| | | | |
|---|---|---|---|
| 8,230,583 B2 | 7/2012 | Lille | |
| 8,238,059 B1 * | 8/2012 | Tang | G11B 5/1278 360/125.03 |
| 8,300,359 B2 * | 10/2012 | Hirata | G11B 5/1278 360/122 |
| 8,323,727 B2 | 12/2012 | Pentek et al. | |
| 8,347,488 B2 | 1/2013 | Hong et al. | |
| 8,570,686 B2 | 10/2013 | Hosomi et al. | |
| 8,649,125 B1 | 2/2014 | Basu et al. | |
| 8,689,430 B1 | 4/2014 | Chen et al. | |
| 8,720,044 B1 * | 5/2014 | Tran | G11B 5/315 29/603.11 |
| 8,980,109 B1 * | 3/2015 | Zhou | G11B 5/84 216/22 |
| 9,111,552 B1 | 8/2015 | Takeo et al. | |
| 9,196,267 B2 | 11/2015 | Basu et al. | |
| 9,214,165 B1 | 12/2015 | Liu et al. | |
| 9,286,919 B1 | 3/2016 | Liu et al. | |
| 9,343,085 B2 | 5/2016 | Basu et al. | |
| 9,361,912 B1 | 6/2016 | Liu et al. | |
| 9,443,541 B1 | 9/2016 | Liu et al. | |
| 9,466,319 B1 | 10/2016 | Tang et al. | |
| 9,495,979 B1 | 11/2016 | Zhang et al. | |
| 9,502,053 B1 | 11/2016 | Sasaki et al. | |
| 9,502,055 B1 | 11/2016 | Misra et al. | |
| 9,508,364 B1 | 11/2016 | Tang et al. | |
| 9,640,204 B2 | 5/2017 | Zhang et al. | |
| 9,721,592 B1 * | 8/2017 | Hirata | G11B 5/3116 |
| 9,741,373 B1 | 8/2017 | Shinohara et al. | |
| 10,014,021 B1 | 7/2018 | Liu et al. | |
| 2008/0278862 A1 | 11/2008 | Kameda et al. | |
| 2012/0140356 A1 | 6/2012 | Horide | |
| 2012/0236431 A1 | 9/2012 | Hirata et al. | |
| 2012/0281314 A1 | 11/2012 | Lopusnik et al. | |
| 2013/0155544 A1 | 6/2013 | Hamasaki et al. | |
| 2014/0063657 A1 | 3/2014 | Gao et al. | |
| 2014/0376131 A1 | 12/2014 | Linville et al. | |
| 2015/0056473 A1 | 2/2015 | Allen et al. | |
| 2015/0131183 A1 | 5/2015 | Katada et al. | |
| 2015/0187373 A1 | 7/2015 | O'Donnell et al. | |
| 2016/0275985 A1 | 9/2016 | Sugawara et al. | |
| 2017/0092306 A1 | 3/2017 | Zhang et al. | |
| 2017/0133042 A1 | 5/2017 | Moore et al. | |
| 2017/0148474 A1 | 5/2017 | Okamura et al. | |
| 2017/0372728 A1 | 12/2017 | Pan et al. | |

\* cited by examiner

WRITE HEAD WITH REDUCED SIDE TO TRAILING SHIELD SPACING

CROSS-REFERENCE TO RELATED APPLICATIONS

This application is a divisional application of U.S. patent application Ser. No. 15/662,682, filed on Jul. 28, 2017, now U.S. Pat. No. 10,141,014, the content of which is hereby incorporated by reference in its entirety.

BACKGROUND

Data storage devices use magnetic recording heads to read and/or write data on magnetic storage media, such as data storage discs. Magnetic recording heads typically include inductive write elements to record data on the storage media. An inductive write element or transducer may include a main pole having a pole tip and one or more return poles. Current is supplied to write coils to induce a flux path in the main pole to record data on one or more magnetic storage layers of the media.

With ever-increasing levels of recording density in disc drives, the write element needs to have correspondingly better data-recording capabilities and needs to be reliable.

SUMMARY

Embodiments of the disclosure relate to a write head with a reduced side to trailing shield spacing compared to a spacing between a write pole and the trailing shield to reduce erasure.

In one embodiment, a write head is provided. The write head includes a bearing surface and a write pole having a front surface that forms a portion of the bearing surface. The front surface of the write pole has a leading edge and a trailing edge. The write pole further includes side edges connecting the leading edge to the trailing edge at the bearing surface. The write head also includes side shields proximate to the side edges of the write pole, and a trailing shield over the write pole and the side shields. A trailing shield-write pole gap is present between the trailing edge of the write pole and the trailing shield, and a trailing shield-side shield gap is present between the trailing shield and the side shields. The trailing shield-side shield gap is substantially less than the trailing shield-write pole gap.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure relate to a write head with a reduced side to trailing shield spacing compared to a spacing between a write pole and the trailing shield to reduce erasure. However, prior to providing details regarding the different embodiments, a description of an illustrative operating environment is provided below.

Figure 1A:
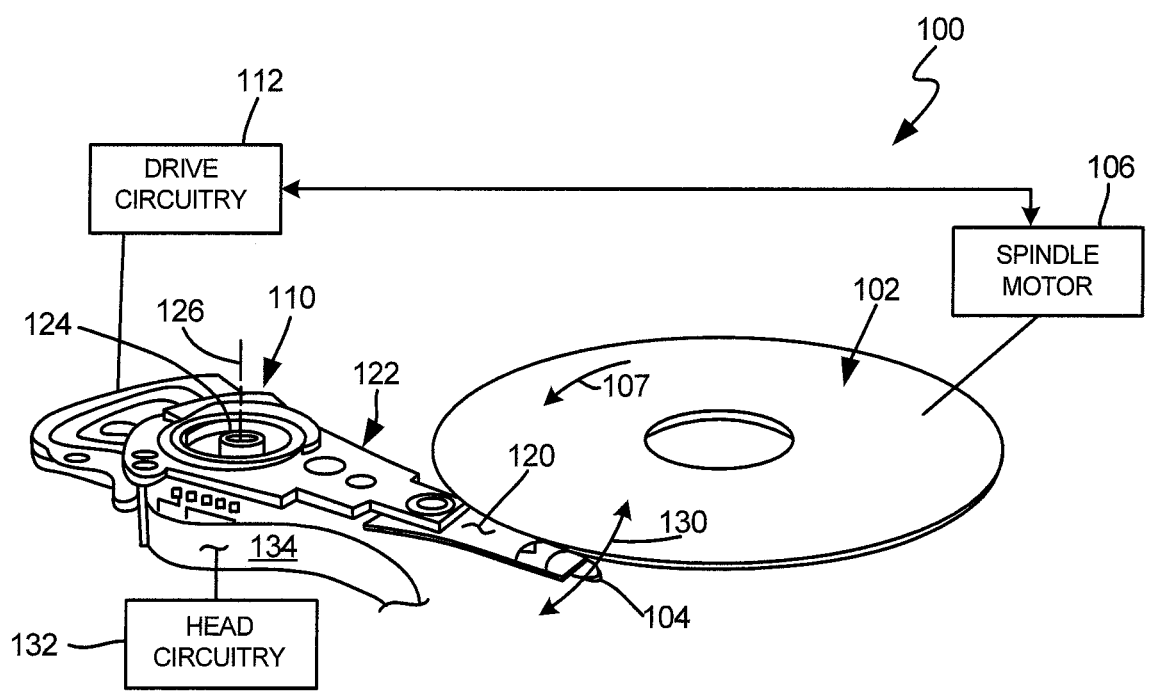
FIG. 1A illustrates an embodiment of a data storage device in which embodiments of the present application can be used.

FIG. 1A shows an illustrative operating environment in which certain recording head embodiments as disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a schematic illustration of a data storage device 100 including a data storage medium and a head for reading data from and/or writing data to the data storage medium. As shown in FIG. 1A, the data storage device 100 includes a data storage medium or disc 102 and a head 104. The head 104 including one or more transducer elements (not shown in FIG. 1A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 1B:
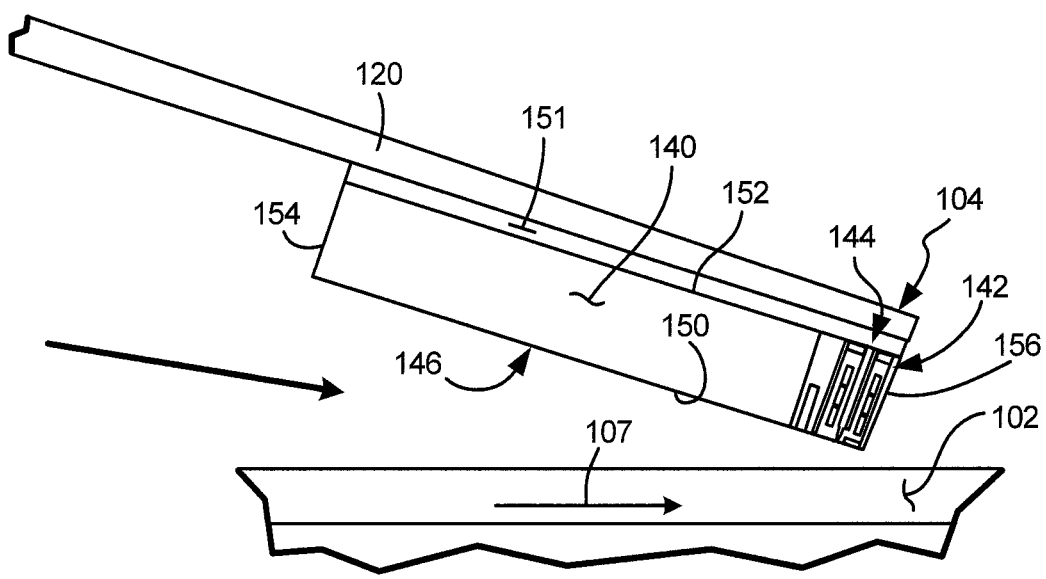
FIG. 1B is a schematic illustration of a head including one or more transducer elements above a magnetic recording medium.

FIG. 1B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, an air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140. A transducer/head portion in accordance with one embodiment is described below in connection with FIGS. 2A and 2B.

Figure 2A:
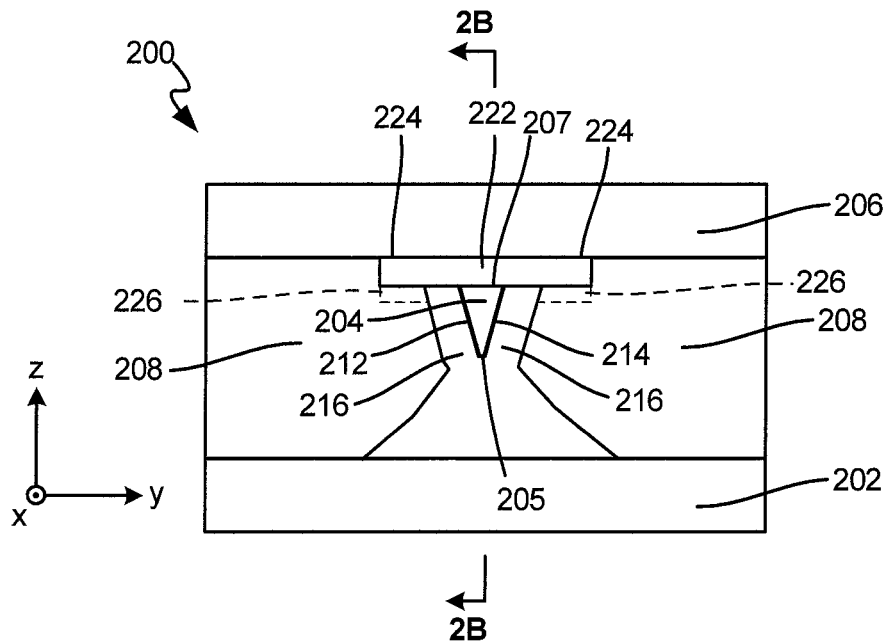
FIG. 2A depicts a bearing surface view of a perpendicular magnetic recording (PMR) transducer in accordance with one embodiment.
Figure 2B:
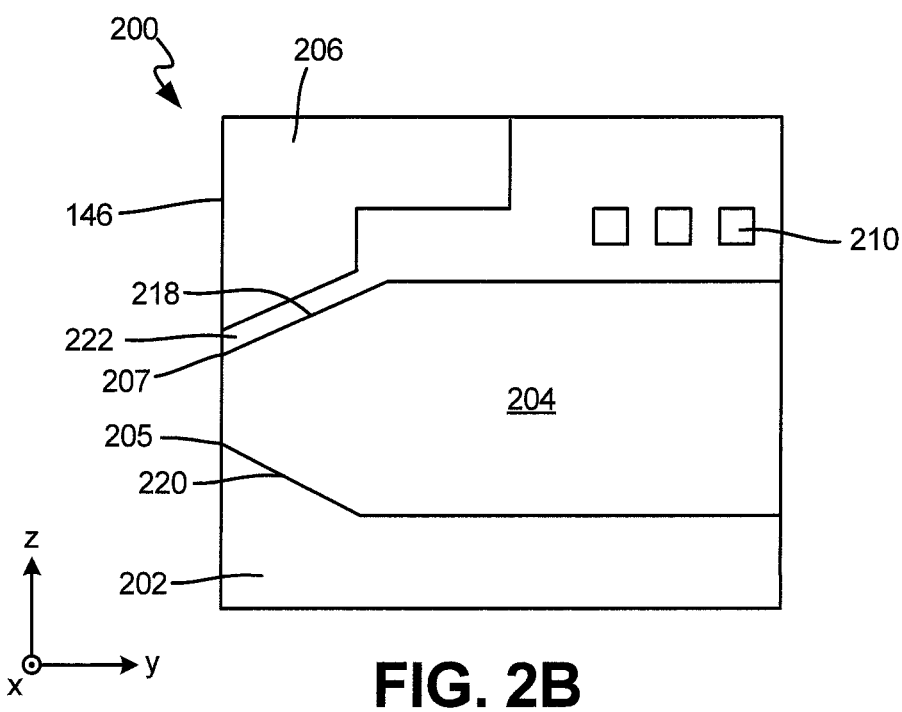
FIG. 2B depicts a side view of the PMR transducer of FIG. 2A.

FIGS. 2A and 2B depict ABS and side views, respectively, of a perpendicular magnetic recording (PMR) transducer 200. The PMR transducer 200 may be a part of a merged head including the write transducer 200 and a read transducer (not shown). Alternatively, the magnetic recording head may be a write head only including the write transducer 200. The PMR transducer elements shown in FIGS. 2A and 2B are illustratively included in a recording head such as recording head 104 of FIGS. 1A and 1B.

The write transducer 200 includes an under-layer/substrate 202, a main pole 204, a trailing shield 206 and side shields 208. The under-layer 202 may include multiple structures which are under the pole 204. The write transducer 200 may also include other components including but not limited to coils (denoted by reference numeral 210 in FIG. 2B) for energizing the main pole 204.

The main pole 204 resides over under-layer 202 and includes sidewalls 212 and 214. Sidewalls 212 and 214 are separated from the side shields 208 by non-magnetic side shield gaps (SSGs) 216. The top (trailing) surface of the main pole 204 may have a beveled portion 218. The bottom (leading) surface of the main pole 204 may also include a leading surface bevel 220. At the bearing surface, the leading surface of the main pole 204 has a leading edge 205 and a trailing edge 207, which are connected by side edges of sidewalls 212 and 214. A trailing shield gap (TSG) 222 is formed between the trailing shield 206 and the main pole 204. In write head/transducer 200, the TSG 222 extends over or outside the SSGs 216 in a cross-track direction, forming overhangs 224 that separate the trailing shield 206 from portions of the side shields 208. The overhangs 224 may be produced by a write head fabrication process that employs photo patterning to define a shape and dimensions of TSG 222 as part of the steps for its formation. In general, a recording head with a TSG including overhangs of the type shown in FIG. 2A may have certain on-track performance advantages, but may also produce side track erasure (STE) and adjacent track interference (ATI) which may be detrimental to a reliability of the recording head, particularly at high data-writing rates.

Figure 3A:
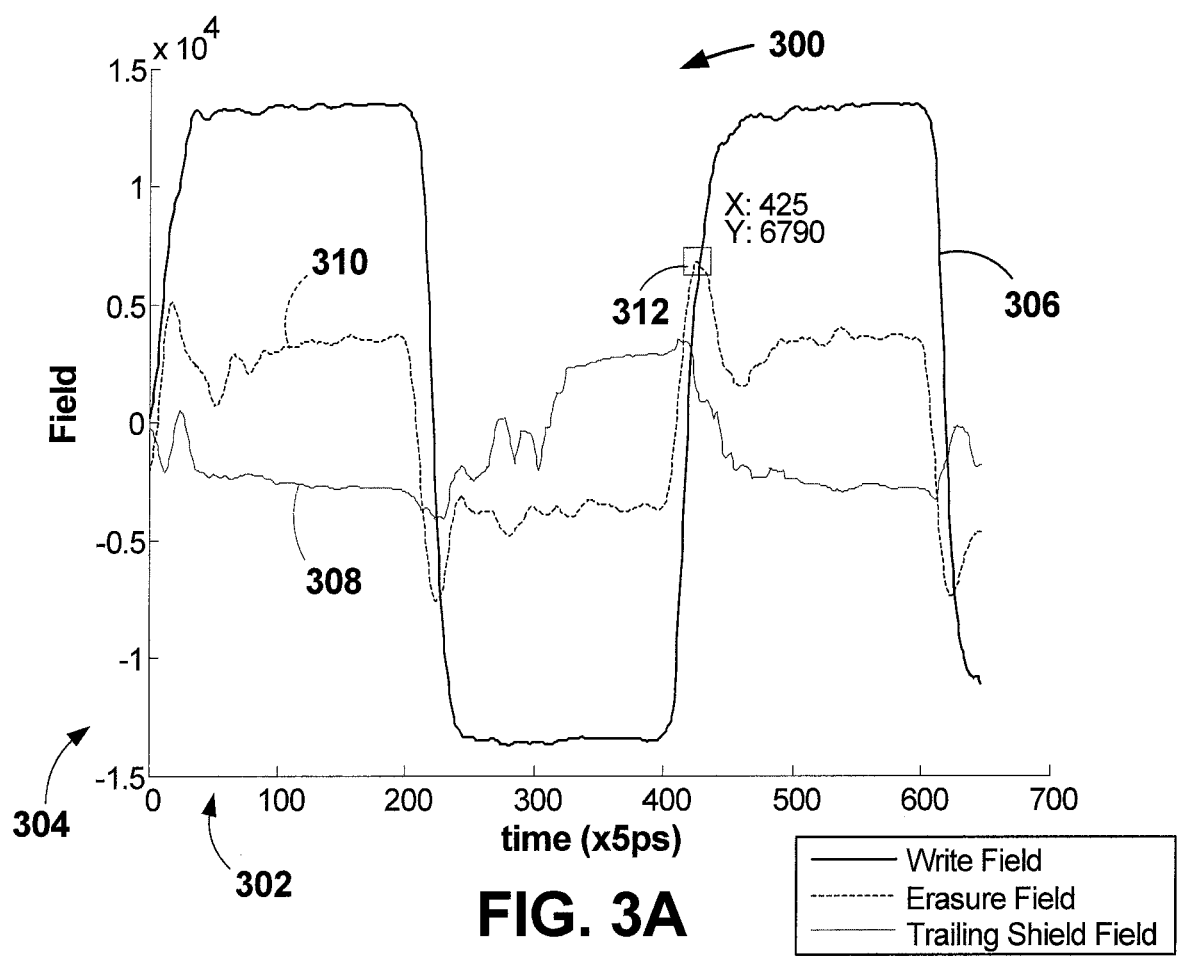
FIG. 3A is a graph illustrating a time dependence of erasure fields, compared to a write pole field and a trailing shield field.
Figure 3B:
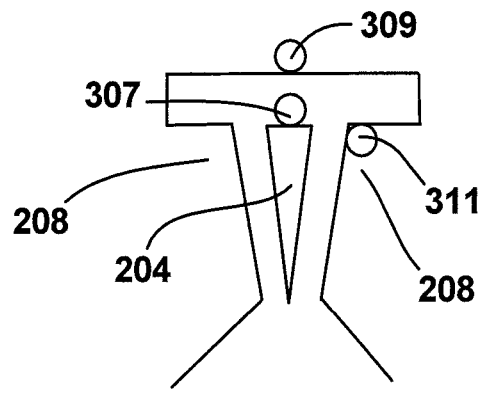
FIG. 3B is a bearing surface view of a portion of a write head in which a magnetization distribution at the bearing surface is illustrated.

FIG. 3A is a graph 300 illustrating a time dependence of erasure fields, compared to a write field and a trailing shield field, and FIG. 3B illustrates locations of those fields at the bearing surface. In FIG. 3A, horizontal axis (x axis) 302 represents time in picoseconds (ps) and vertical axis (y axis) 304 represents magnetic field in Tesla. Plot 306 illustrates a variation of the write field (located at 307 between the write pole and the trailing shield in FIG. 3B) over time. Similarly, plot 308 illustrates a variation of the trailing shield field (located directly under the trailing shield at 309 in FIG. 3B) over time. Also, plot 310 illustrates a variation of the erasure field (located at the point of erasure 311 in FIG. 3B) over time. As can be seen in FIG. 3A, point 312 is a peak erasure field that occurs substantially at a time of reversal of the write pole field.

As has been confirmed by numerous iterations of modeling and experiment, a proximal STE (where proximal indicates 1-3 tracks away from the track on which the write operation with the write head takes place) is dominated by a very fast, about 50 ps of total duration, impulse of erasure fields created between the corner of the side shield and the trailing shield (311 in FIG. 3B). This occurs while the write pole tip undergoes reversal and does not participate in flux creation. The erasure field then has two components: perpendicular to the ABS, created by the charges on the side shield's surface, and a downtrack component, created by the interaction with the trailing shield. The impact of the two components on erasure is very different. The perpendicular component substantially immediately lowers the energy barrier, and therefore during its application there is an increased probability of thermal erasure. However, the magnetization response to the perpendicular component is slow, and by itself does not lower the barrier any further. The downtrack component however applies significant torque and perturbs the magnetization. Its impact on erasure is determined substantially by how far away a media magnetization moves from an equilibrium condition as a result of such perturbation.

In the case of a very long duration of the applied field, the erasure is dominated by the events occurring during the time when the field is applied. The impact of both components combined is very roughly proportional to the effective or Stoner-Wolfarth field, which to the zeroth order accuracy can be simply inserted into the Arrhenius formula to estimate the reduction of energy barrier and the resulting erasure.

Of course, when the duration of field application approaches zero, so does the erasure impact (e.g., probability of magnetization reversal in the media). However, in a limit of very short (sub 100 ps), but non-zero duration, the impact is driven by a combination of factors substantially different from the extreme cases of either zero or very long duration. First, in this case, the magnetization returns to the unperturbed direction during the timeframe comparable with the duration of erasure field application. This means that, if the initial perturbation is significant, it substantially impacts the erasure probability. Second, the probability of erasure during the application of the erasure field purely due to the energy barrier reduction caused by the perpendicular component of the field remains relatively small.

The estimation of magnetization dynamics in the media and therefore the maximum deviation from the equilibrium depends on a multitude of factors, including such that are difficult to evaluate directly (e.g., effective damping). However, the impact on the effectiveness of the erasure field is typically such that, for the same amplitude, the high angle components gain ever more than for the case of Stoner-Wolfarth problem (illustrated in FIGS. 4A and 4B), although the exact magnitude of the gain remains debatable.

Figure 4A:
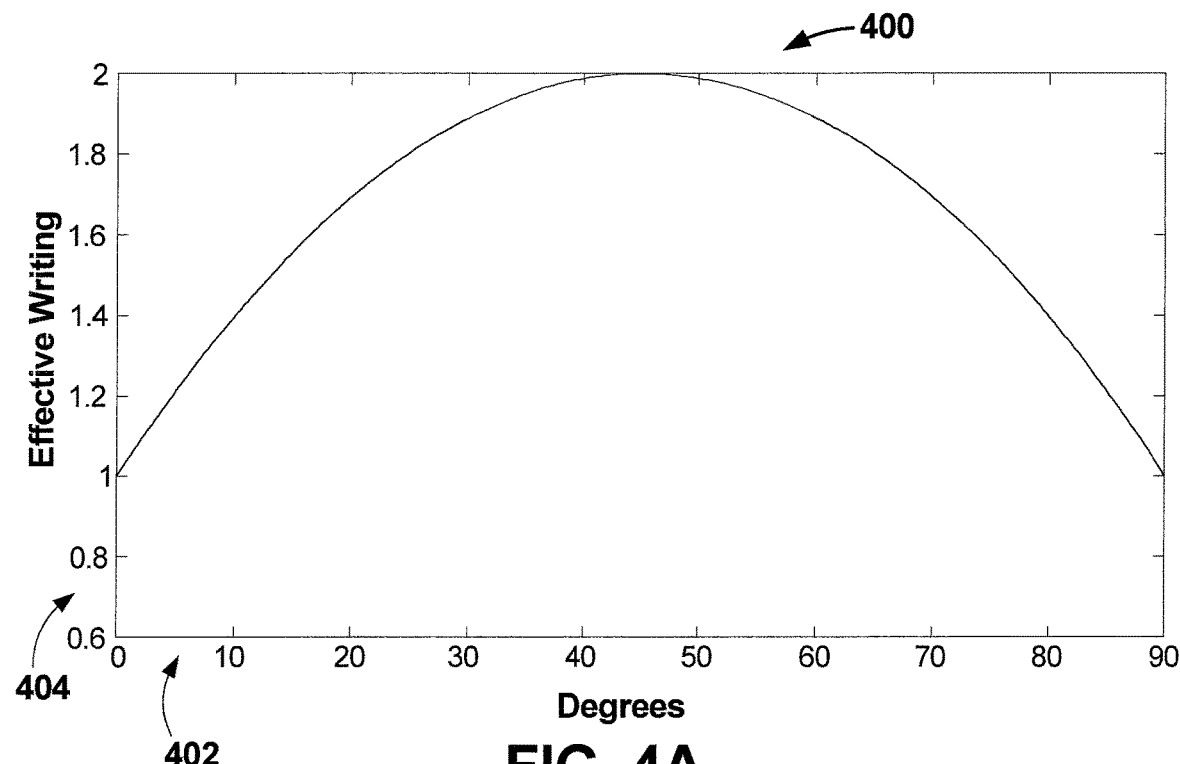
FIG. 4A is a graph showing an efficiency of magnetization reversal under Stoner-Wolfarth conditions.
Figure 4B:
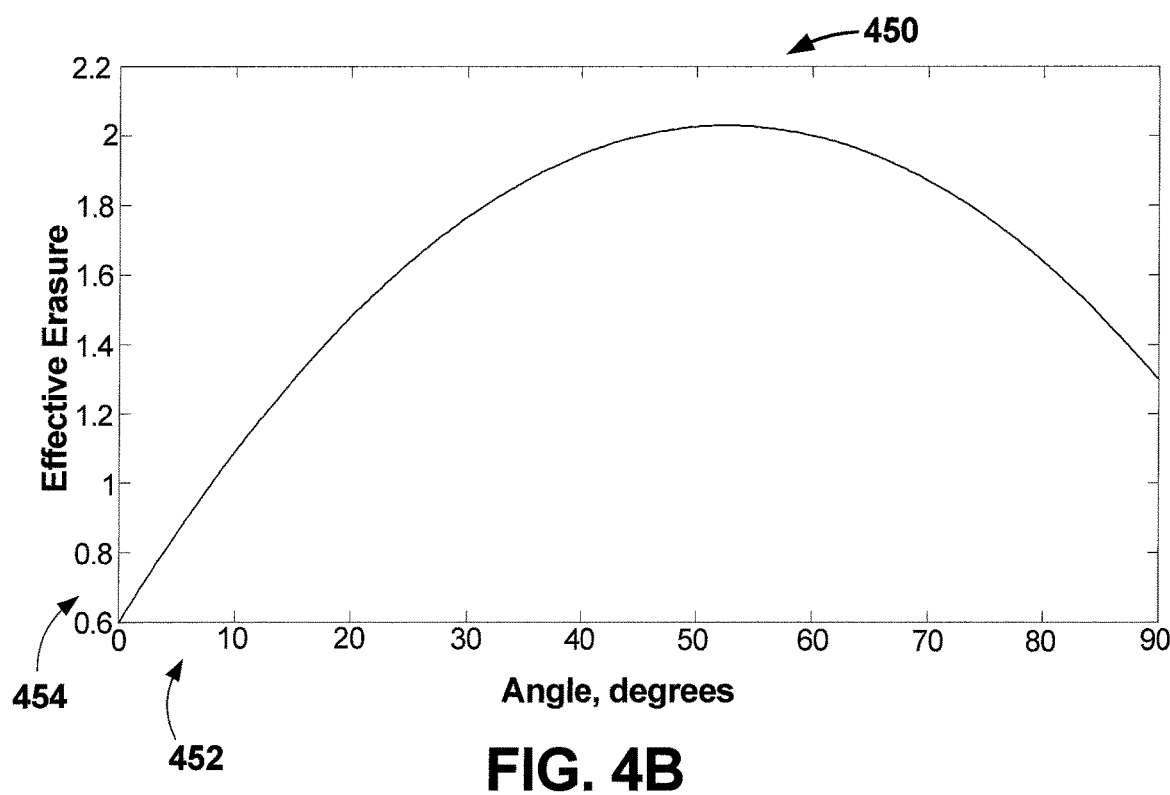
FIG. 4B is a graph showing a calculated relative efficiency of an erasure field applied for a predetermined total duration with a fast rise-time and decay.

FIG. 4A is a graph 400 showing an efficiency of magnetization reversal under Stoner-Wolfarth conditions (long duration, large applied field, large effective damping). In FIG. 4A, horizontal axis (x axis) 402 represents angle in degrees and vertical axis 404 represents effective writing. FIG. 4B is a graph 450 showing a calculated relative efficiency of erasure (Arrhenius process assumed) field applied for 50 ps of total duration with fast rise-time and decay. In FIG. 4B, horizontal axis 452 represents angle in degrees and vertical axis 454 represents effective erasure.

Since the location of erasure is relatively well established (top corner of the side shield and the gap above it), changing the writer design at this location can directly impact the erasure field for the purpose of (1) reducing the absolute amplitude of the erasure field, and (2) reducing the angle of the erasure field, thereby causing a substantial reduction of the downtrack component of the erasure field.

Embodiments of the disclosure reduce both the amplitude and the angle of the erasure field and thus the probability of erasure (seen in FIGS. 4A and 4B) generated in the side shield corner by reducing the gap between the front and side shields in the overhang regions (e.g., 224 of FIG. 2) of the write head. Examples of such embodiments are shown in FIGS. 5A, 5B, 5C and 6 and described below.

Figure 5A:
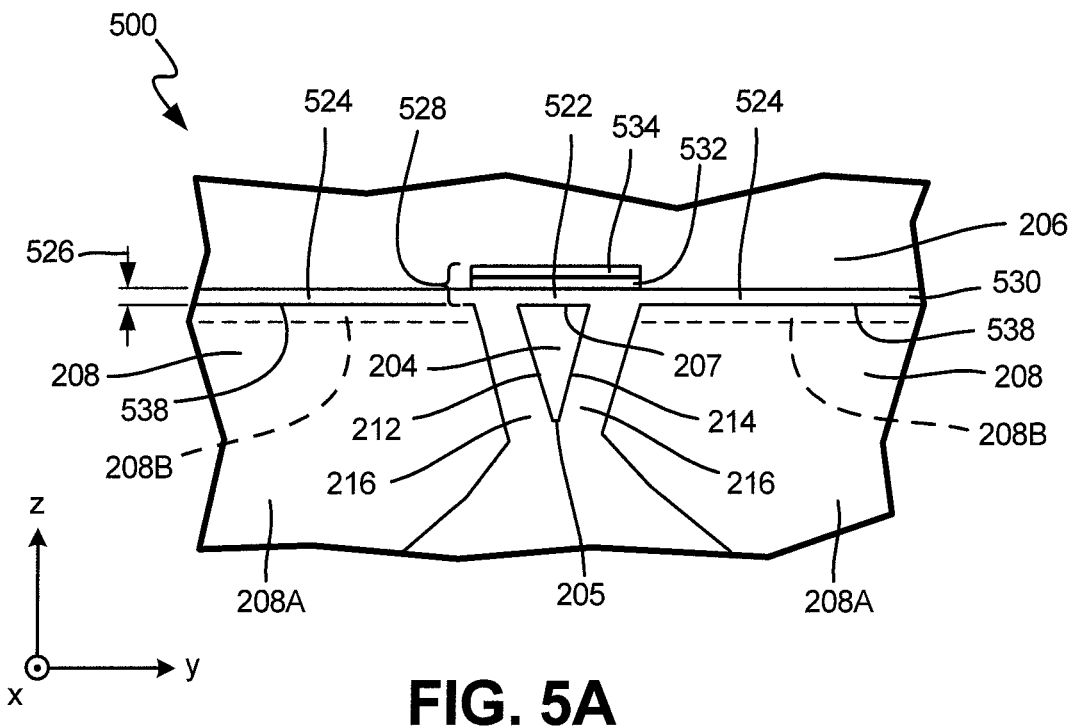
FIGS. 5A, 5B, 5C and 6 are bearing surface views of write heads in accordance with different embodiments.

FIG. 5A is a bearing surface view of a write head 500 in accordance with a first embodiment. Write head 500 of FIG. 5A includes a TSG 522 with overhang regions 524 that are similar to overhang regions 224 of write head 200 of FIG. 2A. However, as can be seen in FIG. 5A, overhang regions 524 have a reduced (non-zero) thickness 526 compared to a thickness 528 of a remaining portion of TSG 522 that is between write pole 204 and trailing shield 206. In FIG. 5A, the reduction in thickness of the overhang regions 524 is accomplished by extending portions of the trailing shield 206 towards the side shields 208.

In some embodiments, overhang regions 524 include a single layer of material denoted by reference numeral 530. In some embodiments, the portion of TSG 522 between write pole 204 and the trailing shield 206 may include multiple layers. In some embodiments, the multiple layers may include layer 530 and one or more additional layers (e.g., 532, 534, etc.). In general, any suitable number of layers (one or more) may be employed to form regions 524 and/or the portion of TSG 522 between the write pole 204 and the trailing shield 206. In the embodiment shown in FIG. 5A, trailing edge 207 of the write pole 204 and upper surfaces 538 of the side shields 208 may be substantially flush. Also, portions of the trailing shield 206 over the side shields 208 are at a lower level than the portion of the trailing shield 206 that is above the write pole 204.

Figure 5B:
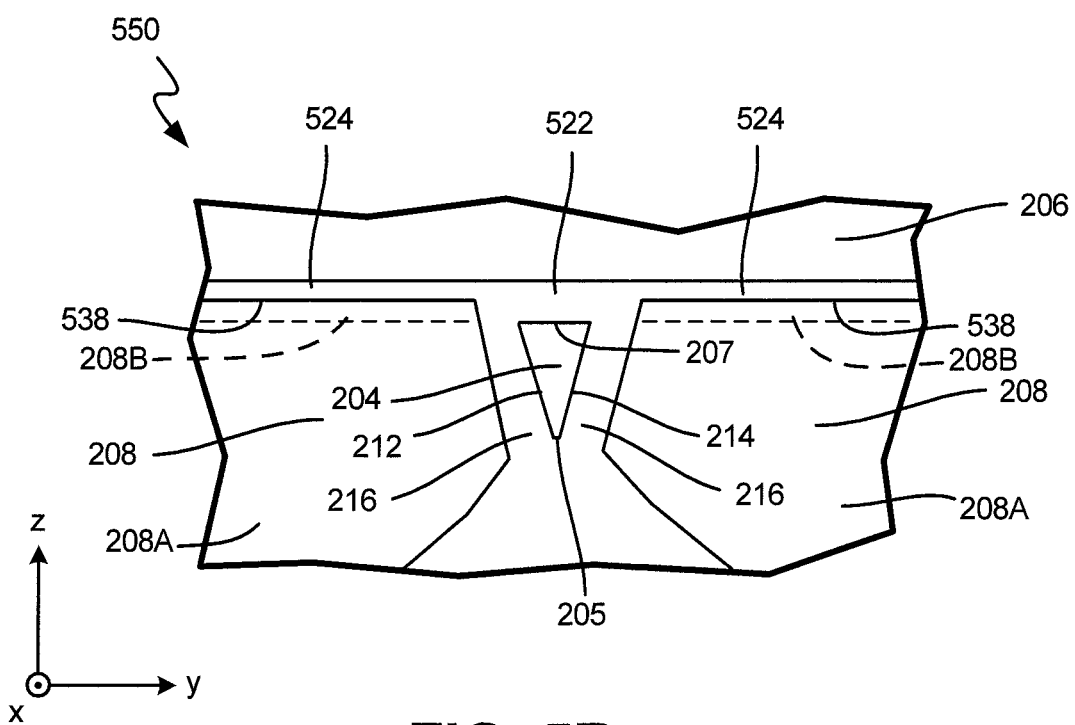

FIG. 5B is a bearing surface view of a write head 550 in accordance with a second embodiment. The embodiment of FIG. 5B is similar to write head 500 of FIG. 5A. However, to reduce the thickness of overhang regions 524, instead of extending portions of the trailing shield 206 towards the side shields 208, the side shields 208 are extended towards the trailing shields. Although not shown in FIG. 5B, in write head 550, any suitable number of layers (one or more) may be employed to form regions 524 and/or the portion of TSG 522 between the write pole 204 and the trailing shield 206. In the embodiment shown in FIG. 5B, the trailing edge 207 of the write pole 204 is at a lower level than the upper surfaces 538 of the side shields 208.

Figure 5C:
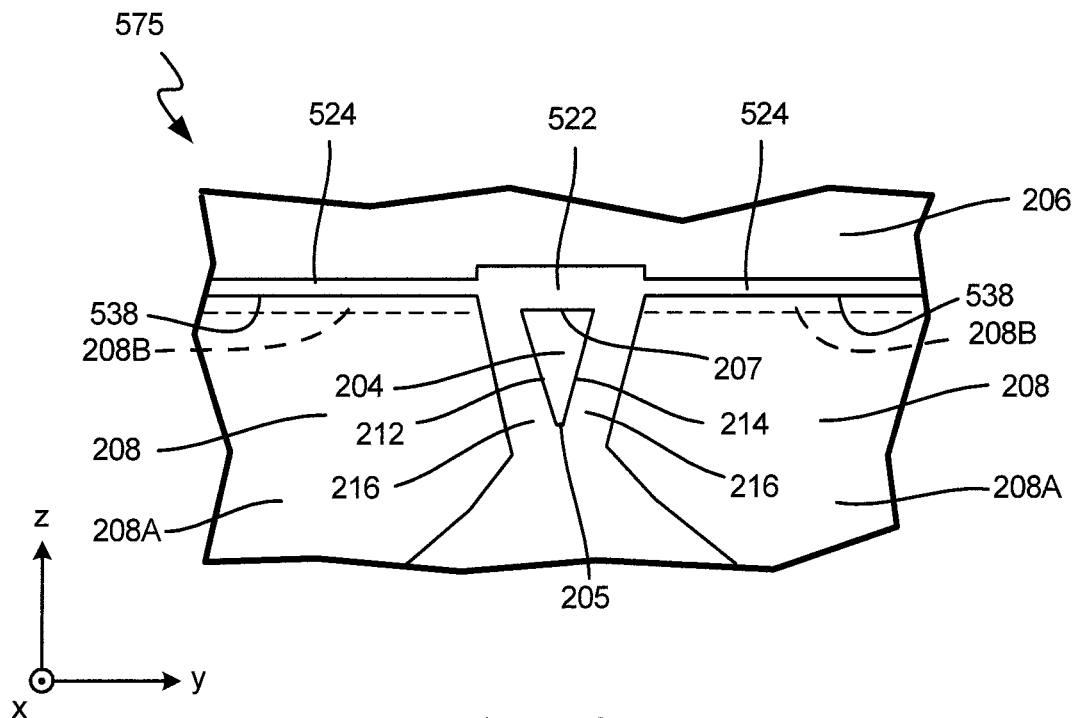

FIG. 5C is a bearing surface view of a write head 575 in accordance with a third embodiment. The embodiment of FIG. 5C is similar to write heads 500 and 550 of FIGS. 5A and 5B, respectively. However, to reduce the thickness of overhang regions 524, both the trailing shield 206 and the side shields 208 are extended towards each other in write head 575 of FIG. 5C. Although not shown in FIG. 5C, in write head 575, any suitable number of layers (one or more) may be employed to form regions 524 and/or the portion of TSG 522 between the write pole 204 and the trailing shield 206. In the embodiment shown in FIG. 5C, the trailing edge 207 of the write pole 204 is at a lower level than the upper surfaces 538 of the side shields 208. Also, portions of the trailing shield 206 over the side shields 208 are at a lower level than the portion of the trailing shield 206 that is above the write pole 204.

Figure 6:
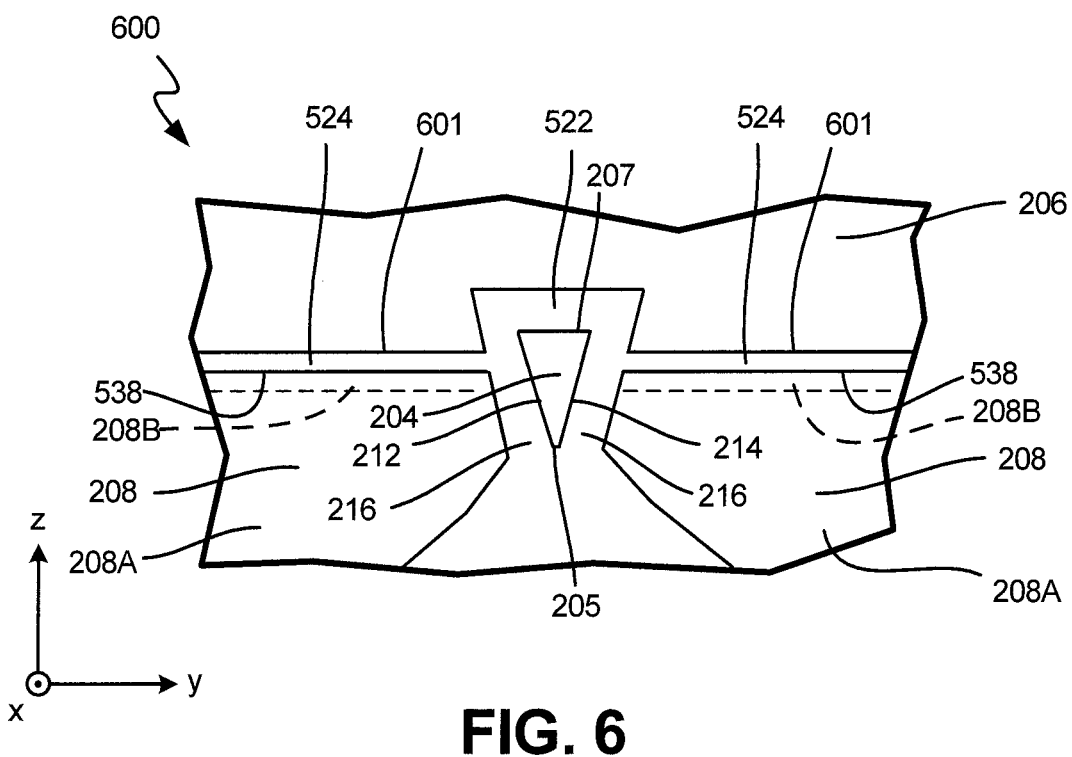

FIG. 6 is a bearing surface view of a write head 600 in accordance with a fourth embodiment. In the embodiment of FIG. 6, the reduction in thickness of the overhang regions 524 is accomplished by extending portions of the trailing shield 206 towards the side shields 208. However, in write head 600, the portions of the trailing shield 206 over regions 524 are at a lower level than the trailing edge 207 of the write pole 204 (e.g., lower surfaces 601 of trailing shield 206 are below trailing edge 207). Also, in the embodiment of FIG. 6, top surfaces 538 of the side shields 208 are closer to the leading edge 205 than in the write head embodiments of FIGS. 5A, 5B and 5C. Although not shown in FIG. 6, in write head 600, any suitable number of layers (one or more) may be employed to form regions 524 and/or the portion of TSG 522 between the write pole 204 and the trailing shield 206.

An erasure event in the side shield cannot close flux through the write pole, and typically excites opposite charges in the trailing shield. Bringing the trailing shield closer to the side shield in accordance with the above-described embodiments both diminishes the perpendicular component of the erasure field (as the opposite charges in the trailing shield create a perpendicular component of the opposite sign), and confines the downtrack component to the area roughly proportional to the gap thickness. If the gap thickness is compared to the distance between the writer and media surfaces, the erasure impact is reduced considerably.

Figure 7:
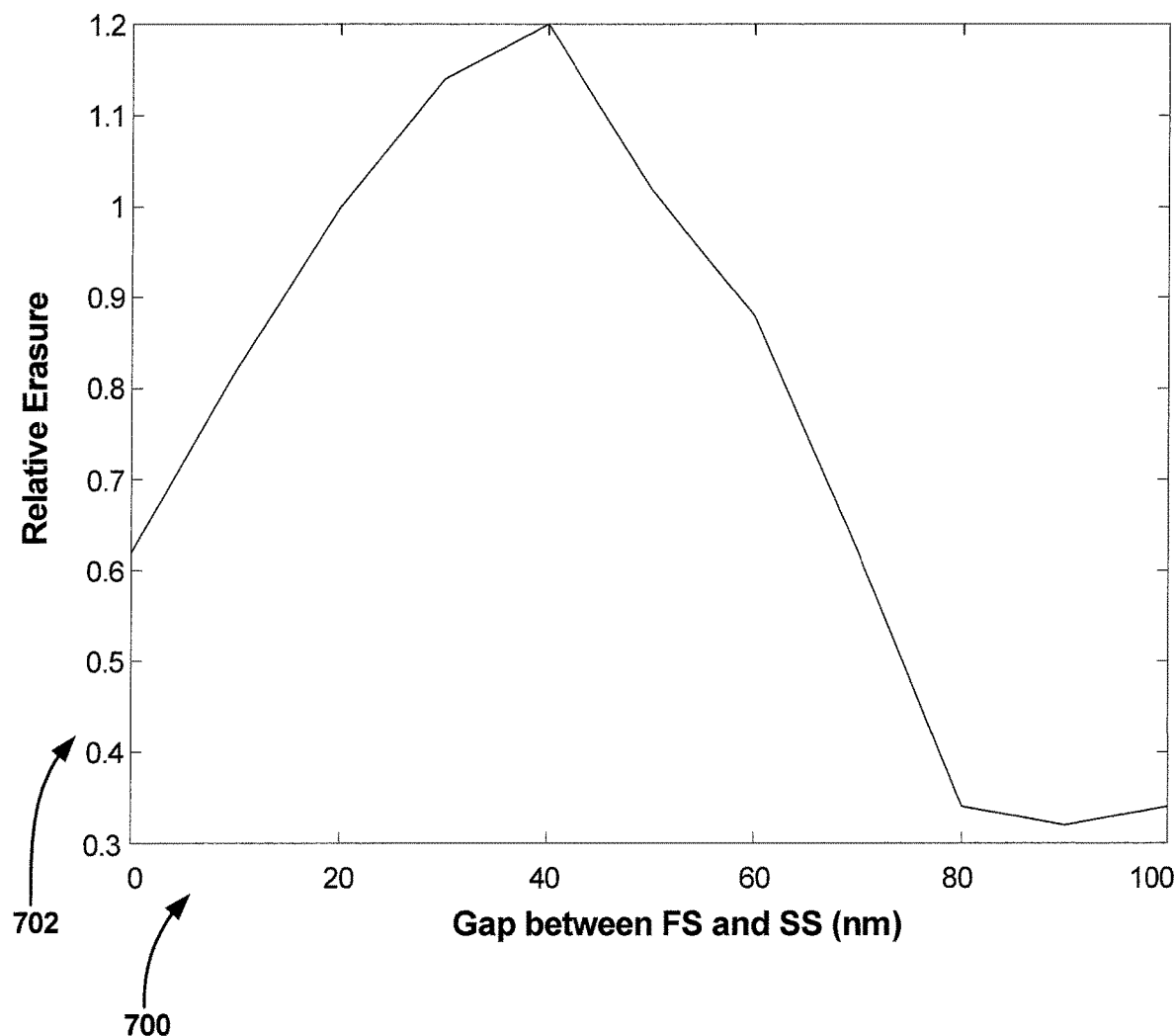
FIG. 7 is a graph illustrating an impact of trailing shield-side shield gap on relative erasure.

This is illustrated in FIG. 7, which is a modeled example of an impact of a gap between the trailing shield and the side shields. In the example shown in FIG. 7, a nominal TSG is 25 nanometers (nm). In the graph shown in FIG. 7, a horizontal axis 700 represents a gap between the trailing shield and the side shields in nm, and a vertical axis 702 represents relative (e.g., nominal) erasure.

It should be noted that the write head 550 configuration shown in FIG. 5B may increase the amount of shield material directly on top of the erasure spot, which may somewhat increase the perpendicular component of the erasure field. However, in write head 550, the undershoot in the trailing shield is also driven further towards the center track location, resulting in improved performance.

Referring back to FIGS. 5A, 5B and 5C, certain additions/alterations may be made to write heads such as 500, 550 and 575 to further reduce erasure fields. For example, in some embodiments, a side shield cap layer having a low saturation magnetization may be provided in each side shield 208. In write heads 500, 550 and 575, write side shield cap layers are shown with dashed lines and denoted by reference numeral 208B. In such embodiments, each side shield 208 includes a main side shield layer 208A and the side shield cap layer 208B. The side shield cap layers 208B are adjacent to the overhang portions 524. The saturation magnetization value of the side shield cap layers 208B is less than a saturation magnetization value of the main side shield layers 208A. Though erasure fields in the media are reduced by the reduction in spacing between the trailing shield 206 and the side shields 208 in the overhang regions 524, the magnetization alignment in the shields 208 is still strongly concentrated around the corner of the side shield 208 and the trailing shield 206, and any reduction in magnetization at that corner (e.g., by the inclusion of low saturation magnetization layer 208B) is likely to reduce the erasure fields further. Another example involves providing a notch in the trailing shield. Extending the trailing shield 206 into the overhang regions 524 by way of the notch allows for limited reduction of the write field with a smaller gap, compared to a non-notch design. Yet another example involves making the overhang regions 524 substantially wider than the overhang regions 224 shown in FIG. 2A. Compared to the wider gap, increase in the width of the overhang 524 may result in substantially weaker increase of erasure, while comparable improvement in the dynamic gradient is provided.

Figure 8:
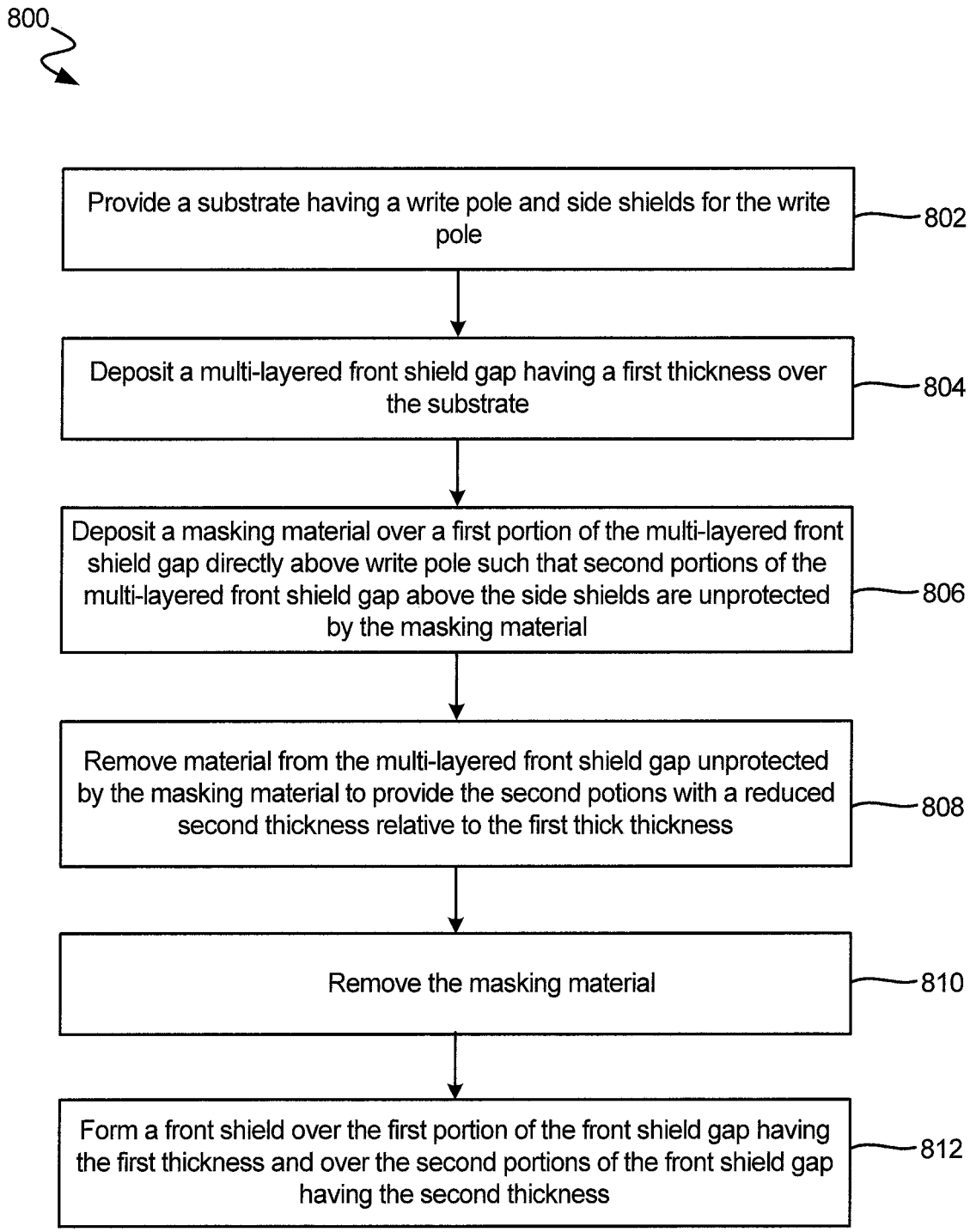
FIG. 8 is a flow diagram of a method embodiment.
Figure 9A:
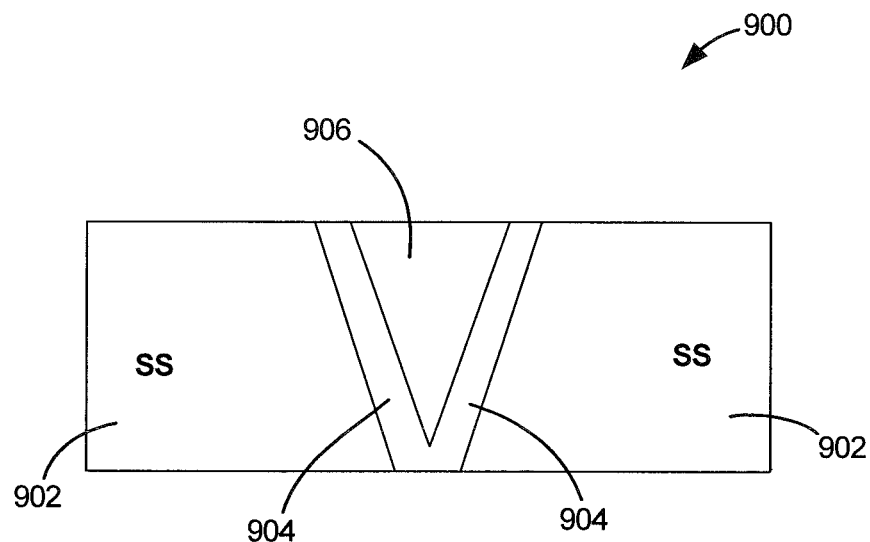
FIGS. 9A-9G illustrate process steps for fabricating a write head of the type shown in FIG. 5A.
Figure 9B:
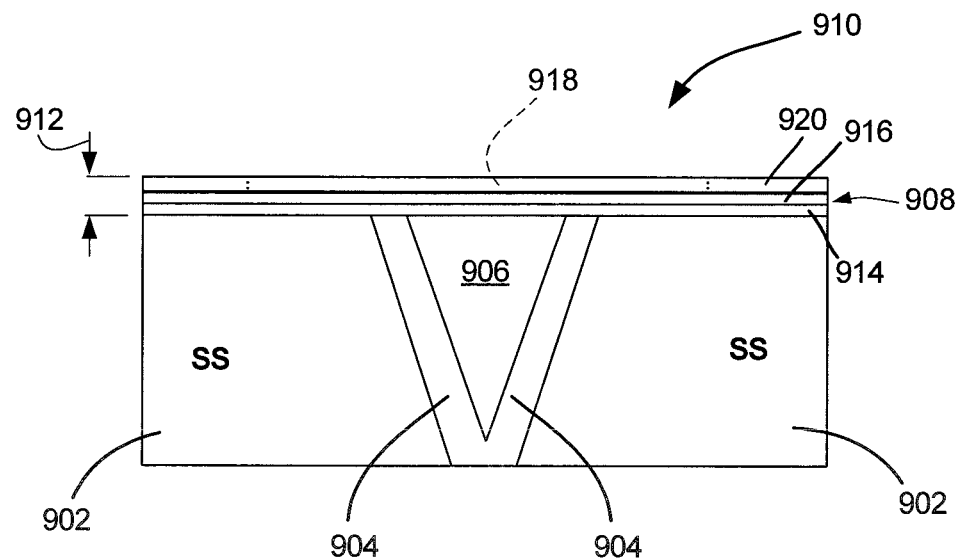

FIGS. 8 and 9A-9F illustrate steps carried out during manufacturing of a write head such as 500 of FIG. 5A. FIG. 8 is a flow diagram 800 of an example method of forming the write head such as 500 FIG. 5A. The process sequence intercepts the write head build at a stage where the top bevel has been formed (218 in FIG. 2B) as shown in FIG. 9A. FIG. 9A illustrates bearing surface view of a first partial write head structure or substrate 900 that includes side shields 902, side shield gap layers 904 and write pole 906. Process step 802 of FIG. 8 indicates that such a partial write head structure is provided.

Starting with first partial write head structure 900, step 804 of FIG. 8 is carried out. Step 804 involves depositing a multi-layered trailing shield gap 908 over the substrate 900 to provide a second partial write head structure 910. The multi-layered trailing shield gap 908 has a first thickness 912. In one embodiment, the multi-layered structure may include a first thin metal layer 914, an insulation layer 916, an activated carbon layer 918 that is recessed behind a bearing surface of the write head and shown in FIG. 9D, and a second thin metal layer 920. In a particular embodiment, the first thin metal layer 914 and the second thin metal layer 920 may be non-magnetic layers including, for example, at least one of Ru, Cr, NiRu, NiCr, Ta or alloys thereof. It should be that other non-magnetic metals may also be used to form layers 914 and 920. Each of layers 914 and 920 may be between about 1 nm and about 10 nm thick. In some embodiments, the insulation layer 916 includes alumina ($Al_2O_3$). The second thin metal layer 920 protects the insulation layer 916 from some of the subsequent processes. Insulation layer 916 may have a thickness in the range of 5-25 nm.

On second partial write head structure 910, in accordance with step 806 of FIG. 8, a masking material 922 (see FIG. 9C) is deposited over a first portion of the multi-layered trailing shield gap 908 directly above write pole 906 such that second portions of the multi-layered trailing shield gap 908 above the side shields 902 are unprotected by the masking material 922. This step may involve utilizing photo patterning to define a dimension of the first portion of the trailing shield gap 908. The third partial write head structure that includes the masking material (e.g., photoresist) 922 shown in FIG. 9C is denoted by reference numeral 924.

In accordance with step 808 of FIG. 8, a material removal process is carried out to remove material from the trailing shield gap 908 that is unprotected by the masking material to provide the second portions with a reduced second thickness relative to the first thickness 912. The material removal process may involve several sub steps. Examples of such sub steps are provided below.

Figure 9C:
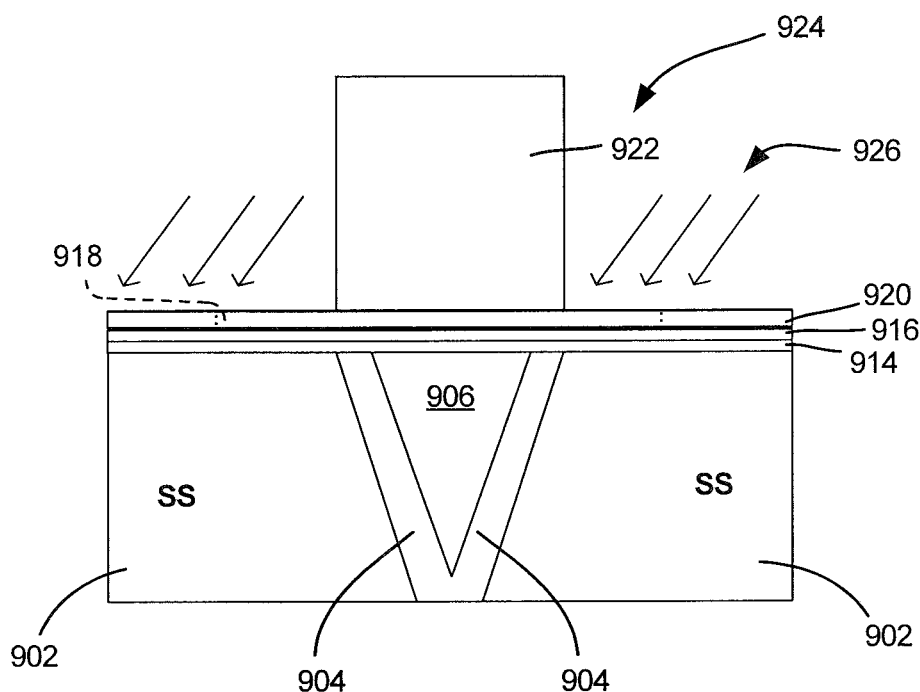

In one embodiment, the second metal layer 920 previously deposited is removed by an etch or a mill process, which is denoted by reference numeral 926 in FIG. 9C. Process 926 exposes the activated carbon layer 918 that is recessed behind the bearing surface. The fourth partial write head structure with the exposed activated carbon layer 918 is denoted by reference numeral 928 and shown in FIG. 9D.

Figure 9D:
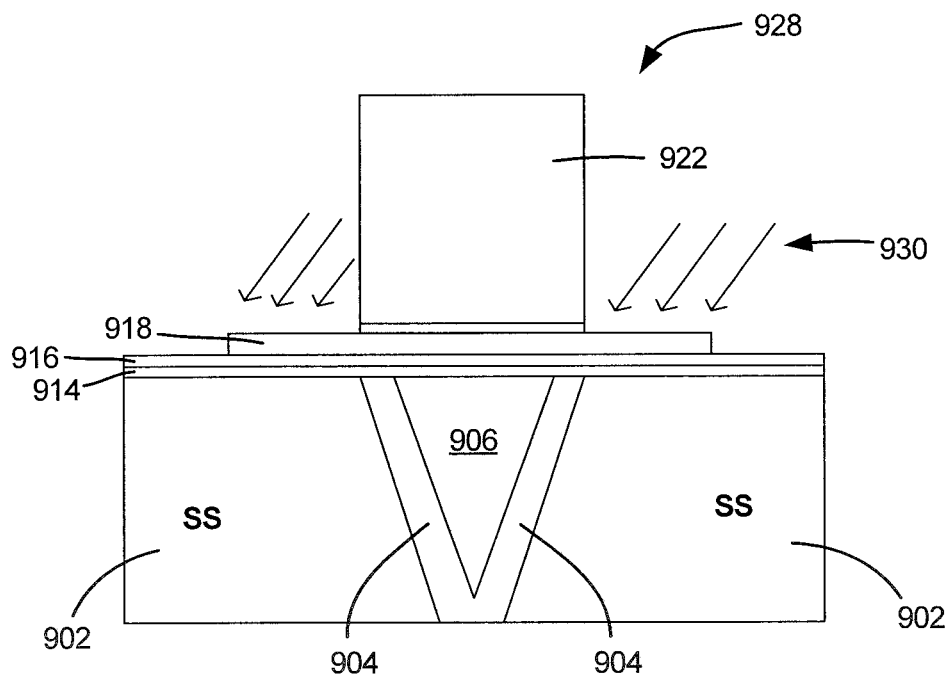
Figure 9E:
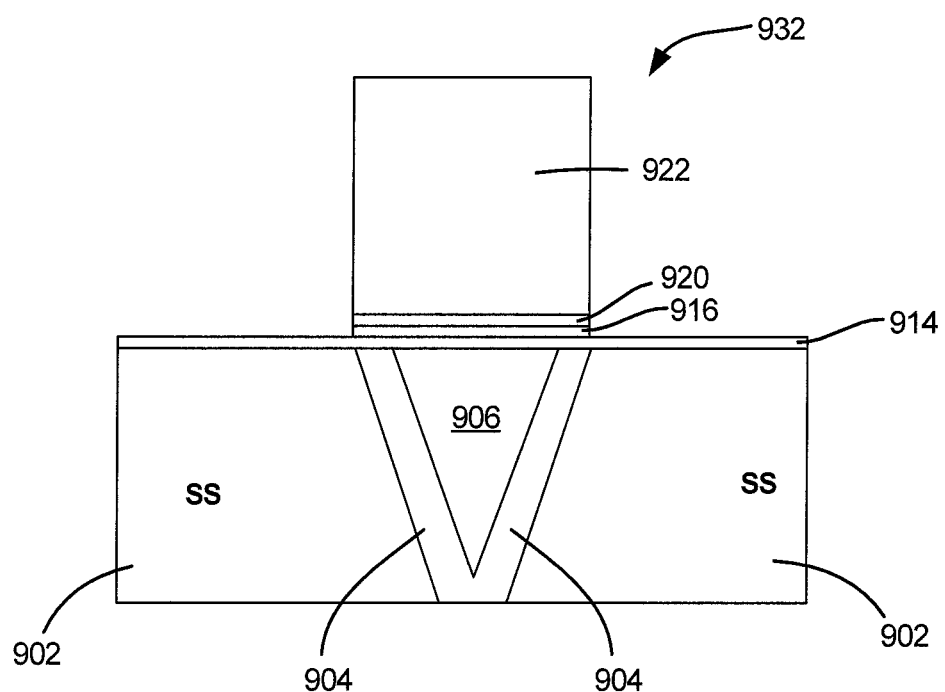
Figure 9F:
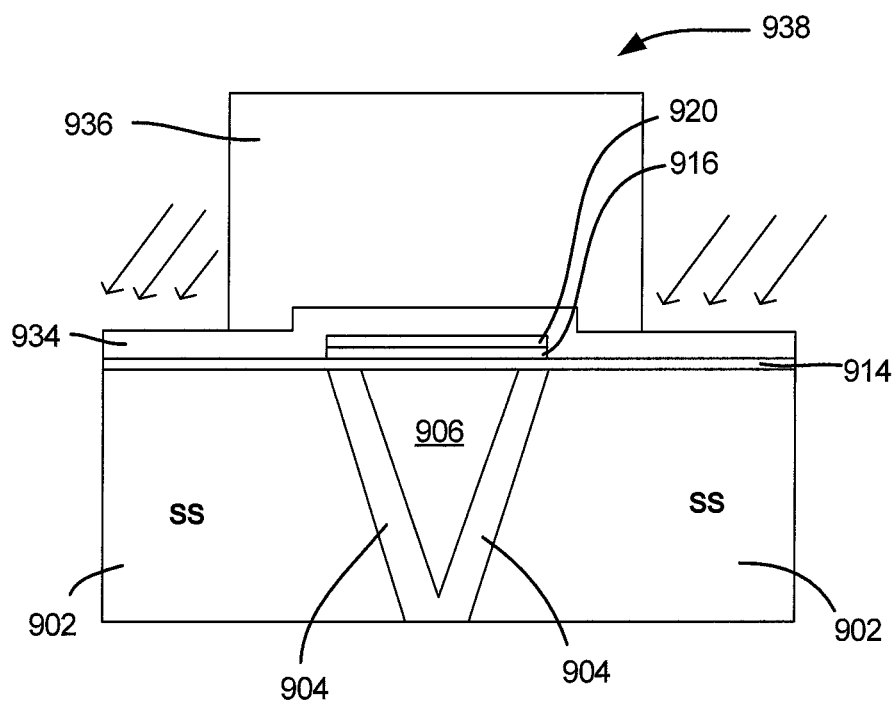

On the fourth partial write head structure 928, a material removal process 930 such as an inductively coupled plasma (ICP) etch process is carried out as shown in FIG. 9D to remove the exposed activated carbon layer 918. A wet etch process or an ICP process or a reactive ion-beam (RIB) etch process may then be performed to remove portions of the insulation layer 916 that are not covered by the masking material (e.g., the photoresist) 922 and the remaining portion of the second metal layer 920. In one embodiment, a deliberately selected chemistry (e.g., Tetramethylammonium hydroxide (TMAH)) that has a relatively low etching rate may be utilized to provide sufficient control and less undercutting of the insulation layer 916. The previously deposited first thin metal layer 914 serves as a wet etch stop layer or an ICP or a RIB stop layer, and therefore is left behind after the wet etch is completed. The resulting fifth partial write head structure 932 is shown in FIG. 9E.

The masking material 922 is removed from the fifth partial write head structure 932, and a magnetic layer 934 (shown in FIG. 9F) is deposited over the wafer including the remaining portion of structure 932. Magnetic layer 934 may have a thickness between about 30 nm and 100 nm. Dimensions of magnetic layer 934 and metal layer 914 are defined together. A masking material 936 of the defined dimension is included over the magnetic layer 934. The resulting sixth intermediate partial write head structure is denoted by reference numeral 938 in FIG. 9F.

Figure 9G:
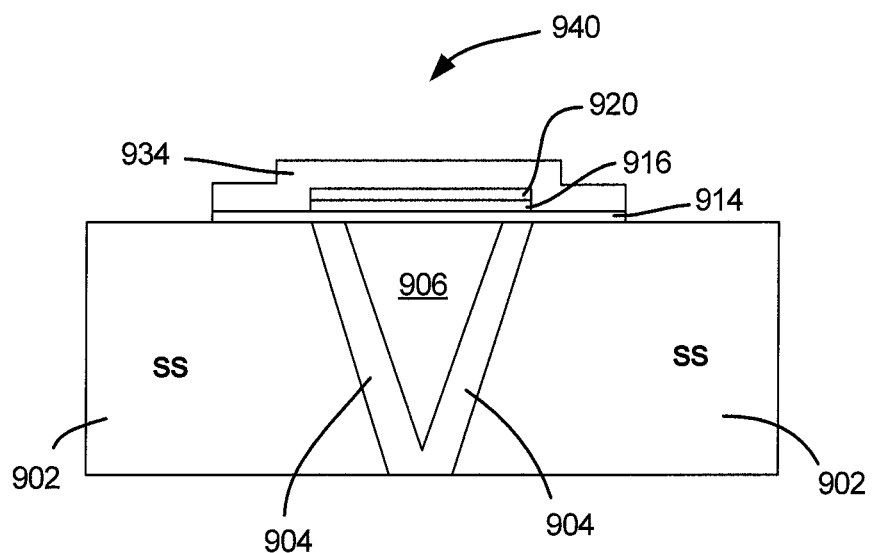

Portions of the magnetic layer 934 and the metal layer 914, which are not covered by the masking material 936, are then removed by, for example, an ion mill or etch process. The material removal process results in layer 914 having portions that extend outside layer 916/920, thereby providing a reduced gap between layer 934 and side shield 902. Masking material 936 is then removed to provide a seventh partial write head structure 940 shown in FIG. 9G. Other steps are then carried out to complete the formation of the write head.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of forming a write head, the method comprising:
   providing a substrate having a write pole and side shields for the write pole, the substrate having an upper surface including a trailing edge of the write pole and upper surfaces of the side shields;
   depositing a multi-layered trailing shield gap over the substrate, the multi-layered trailing shield gap having a first thickness and comprising a first thin metal layer, an insulation layer, an activated carbon layer that is recessed behind a bearing surface of the write head and a second thin metal layer;
   depositing a masking material over a first portion of the multi-layered trailing shield gap directly above the write pole such that second portions of the multi-layered trailing shield gap above the side shields are unprotected by the masking material;
   removing a material from the multi-layered trailing shield gap unprotected by the masking material to provide the second portions with a reduced second thickness relative to the first thickness of the first portion;
   removing the masking material; and
   forming a trailing shield over the first portion of the multi-layered trailing shield gap having the first thickness and over the second portion of the multi-layered trailing shield gap having the second thickness.

2. The method of claim 1 and wherein removing material from the multi-layered trailing shield gap unprotected by the masking material comprises removing unprotected portions of the second thin metal layer, the insulation layer and the activated carbon layer to leave behind the first thin metal layer that provides the second thickness of the second portion of the multi-layered trailing shield gap.

3. The method of claim 1 and wherein the first thin metal layer and the second thin metal layer are non-magnetic layers comprising at least one of Ru, Cr, NiRu, NiCr, Ta or alloys thereof, and wherein the insulation layer comprises alumina.

4. A method of forming a write head, the method comprising:
   providing a substrate having a write pole and side shields for the write pole, the substrate having an upper surface including a trailing edge of the write pole and upper surfaces of the side shields;
   depositing a multi-layered trailing shield gap over the substrate with one of the multiple layers of the multi-layered trailing shield gap being an activated carbon layer, the multi-layered trailing shield gap having a first thickness;
   depositing a masking material over a first portion of the multi-layered trailing shield gap directly above the write pole such that second portions of the multi-layered trailing shield gap above the side shields are unprotected by the masking material;
   removing a material from the multi-layered trailing shield gap unprotected by the masking material to provide the second portions with a reduced second thickness relative to the first thickness of the first portion;
   removing the masking material; and
   forming a trailing shield over the first portion of the multi-layered trailing shield gap having the first thickness and over the second portion of the multi-layered trailing shield gap having the second thickness.

5. The method of claim 4 and wherein the multi-layered trailing shield gap comprises:
   a first thin metal layer;
   an insulation layer; and
   a second thin metal layer.

6. The method of claim 5 and wherein removing material from the multi-layered trailing shield gap unprotected by the masking material comprises removing unprotected portions of the second thin metal layer, the insulation layer and the activated carbon layer to leave behind the first thin metal layer that provides the second thickness of the second portion of the multi-layered trailing shield gap.

7. The method of claim 6 and wherein the first thin metal layer and the second thin metal layer are non-magnetic layers comprising at least one of Ru, Cr, NiRu, NiCr, Ta or alloys thereof, and wherein the insulation layer comprises alumina.

8. A method of forming a write head, the method comprising:
   providing a substrate having a write pole and side shields for the write pole, the substrate having an upper surface including a trailing edge of the write pole and upper surfaces of the side shields;
   depositing a multi-layered trailing shield gap over the substrate, the multi-layered trailing shield gap having a first thickness and comprising a first thin metal layer, an insulation layer and a second thin metal layer;
   depositing a masking material over a first portion of the multi-layered trailing shield gap directly above the write pole such that second portions of the multi-layered trailing shield gap above the side shields are unprotected by the masking material;
   removing a material from the multi-layered trailing shield gap unprotected by the masking material to provide the second portions with a reduced second thickness relative to the first thickness of the first portion;
   removing the masking material; and
   forming a trailing shield over the first portion of the multi-layered trailing shield gap having the first thickness and over the second portion of the multi-layered trailing shield gap having the second thickness.

9. The method of claim 8 and wherein removing material from the multi-layered trailing shield gap unprotected by the masking material comprises removing unprotected portions of the second thin metal layer and the insulation layer to leave behind the first thin metal layer that provides the second thickness of the second portion of the multi-layered trailing shield gap.

10. The method of claim 8 and wherein the first thin metal layer and the second thin metal layer are non-magnetic layers comprising at least one of Ru, Cr, NiRu, NiCr, Ta or alloys thereof, and wherein the insulation layer comprises alumina.

11. The method of claim 8 and wherein the multi-layered trailing shield gap comprises:
   an activated carbon layer that is recessed behind a bearing surface of the write head.

12. The method of claim 8 and wherein removing material from the multi-layered trailing shield gap unprotected by the masking material comprises removing unprotected portions of the first thin metal layer, the insulation layer and the activated carbon layer.

* * * * *